United States Patent
Gao et al.

(10) Patent No.: US 12,309,424 B1
(45) Date of Patent: May 20, 2025

(54) GRID-BASED PATCH GENERATION FOR VIDEO-BASED POINT CLOUD CODING

(71) Applicant: TENCENT AMERICA LLC, Palo Alto, CA (US)

(72) Inventors: Wen Gao, West Windsor, NJ (US); Xiang Zhang, Palo Alto, CA (US); Shan Liu, Palo Alto, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 266 days.

(21) Appl. No.: 17/977,638

(22) Filed: Oct. 31, 2022

Related U.S. Application Data

(60) Provisional application No. 63/279,673, filed on Nov. 15, 2021.

(51) Int. Cl.
*H04N 19/597* (2014.01)

(52) U.S. Cl.
CPC .................. *H04N 19/597* (2014.11)

(58) Field of Classification Search
CPC .................................................. H04N 19/597
See application file for complete search history.

(56) References Cited

U.S. PATENT DOCUMENTS

| | | | |
|---|---|---|---|
| 2018/0053324 A1* | 2/2018 | Cohen | G06T 9/001 |
| 2020/0151913 A1 | 5/2020 | Budagavi et al. | |
| 2020/0219286 A1* | 7/2020 | Sinharoy | G06T 7/174 |
| 2020/0252647 A1* | 8/2020 | Lasserre | G06T 15/04 |
| 2021/0174551 A1 | 6/2021 | Graziosi et al. | |
| 2021/0241496 A1* | 8/2021 | Pesonen | G06T 5/00 |
| 2021/0304443 A1* | 9/2021 | Zhang | G06T 9/40 |

FOREIGN PATENT DOCUMENTS

WO 2021/202220 A1 10/2021

OTHER PUBLICATIONS

Christian Tulvan, et al., "International Organisation for Standardisation Organisation Internationale De Normalisation ISO/IEC JTC1/SC29/WG11 Coding of Moving Pictures and Audio" (Use Cases for Point Cloud Compression (PCC), ISO/IEC JTC1/SC29/WG11 MPEG2015/ n16331, Geneva, CH, Jun. 2016.

(Continued)

*Primary Examiner* — Jeremiah C Hallenbeck-Huber
(74) *Attorney, Agent, or Firm* — Sughrue Mion, PLLC

(57) ABSTRACT

Methods and apparatuses of grid-based patch generation for point cloud coding are provided. The method includes obtaining an input that is a point cloud; grouping one or more voxels in the point cloud into one or more grids, the one or more grids having a cubic dimension; determining whether the cubic dimension associated with the one or more grids exceeds a threshold value; in response to determining the cubic dimension exceeds the threshold value, generating a gridded point cloud; generating one or more patches in the gridded point cloud; converting the one or more patches in the gridded point cloud to one or more patches in the input point cloud; outputting the one or more patches to one or more output devices.

17 Claims, 11 Drawing Sheets

(56) References Cited

OTHER PUBLICATIONS

Rufael Mekuria, et al., "International Organisation for Standardisation Organisation Internationale De Normalisation ISO/IEC JTC1/SC29/WG11 Coding of Moving Pictures and Audio" (Requirements for Point Cloud Compression), ISO/IEC JTC1/SC29/WG11 MPEG2016/n16330, Geneva, CH, Feb. 2016.

"ISO/IEC JTC 1/SC 29/WG 7 MPEG 3D Graphics Coding Convenorship: AFNOR (France) (V-PCC Codec Description)", ISO/IEC JTC 1/SC 29/WG 7, N00012, Dec. 1, 2020, pp. 1-73.

International Search Report dated Feb. 22, 2023 from the International Searching Authority in International Application No. PCT/US2022/048790.

Written Opinion dated Feb. 22, 2023 from the International Searching Authority in International Application No. PCT/US2022/048790.

\* cited by examiner

GRID-BASED PATCH GENERATION FOR VIDEO-BASED POINT CLOUD CODING

CROSS-REFERENCE TO RELATED APPLICATION(S)

This application is based on and claims priority to U.S. Patent Application No. 63/279,673, filed on Nov. 15, 2021, the disclosure of which is incorporated herein by reference in its entirety.

TECHNICAL FIELD

The present disclosure provides a method for grid-based patch generation for video-based cloud coding (V-PCC). The disclosure is related to Point Cloud Coding (PCC).

BACKGROUND

A point cloud has been widely used in recent years. For example, a point cloud is used in autonomous driving vehicles for object detection and localization. A point cloud is also used in geographic information systems (GIS) for mapping, and used in archeology applications to visualize and archive cultural heritage objects and collections, etc.

Point clouds contain a set of high dimensional points, typically of three dimensional (3D), each including 3D position information and additional attributes such as color, reflectance, etc. Point clouds may be captured using multiple cameras and depth sensors, or Lidar in various setups, and may be made up of thousands up to billions of points to realistically represent the original scenes.

Compression technologies are needed to reduce the amount of data required to represent a point cloud for faster transmission or reduction of storage. ISO/IEC MPEG (JTC 1/SC 29/WG 11) has created an ad-hoc group (MPEG-PCC) to standardize the compression techniques for static or dynamic point clouds.

SUMMARY

The following presents a simplified summary of one or more embodiments of the present disclosure in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments of the present disclosure in a simplified form as a prelude to the more detailed description that is presented later.

This disclosure provides a method for point cloud coding. According to an exemplary embodiment, a method for grid-based patch generation for point cloud coding. The method performed by at least one processor includes obtaining an input that is a point cloud. The method further includes grouping one or more voxels in the point cloud into one or more grids, the one or more grids having a cubic dimension. The method further includes determining whether the cubic dimension associated with the one or more grids exceeds a threshold value. The method further includes in response to determining the cubic dimension exceeds the threshold value: generating a gridded point cloud, generating one or more patches in the gridded point cloud, converting the one or more patches in the gridded point cloud to one or more patches in the input point cloud, and outputting the one or more patches to one or more output devices.

According to an exemplary embodiment, an apparatus for grid-based patch generation for point cloud coding. The apparatus includes at least one memory configured to store computer program code and at least one processor configured to access the computer program code and operate as instructed by the computer program code. The computer program code includes obtaining code configured to cause the at least one processor to obtain an input that is a point cloud. The computer program code further includes grouping code configured to cause the at least one processor to group one or more voxels in the point cloud into one or more grids, the one or more grids having a cubic dimension. The computer program code further includes determining code configured to cause the at least one processor to determine whether the cubic dimension associated with the one or more grids exceeds a threshold value. In response to determining the cubic dimension exceeds the threshold value the code is further configured to cause the at least one processor to: generate a gridded point cloud, generate one or more patches in the gridded point cloud, convert the one or more patches in the gridded point cloud to one or more patches in the input point cloud, and output the one or more patches to one or more output devices.

According to an exemplary embodiment, a non-transitory computer readable medium having stored thereon computer instructions that when executed by at least one processor cause the at least one processor to execute a method. The method includes obtaining an input that is a point cloud. The method further includes grouping one or more voxels in the point cloud into one or more grids, the one or more grids having a cubic dimension. The method further includes determining whether the cubic dimension associated with the one or more grids exceeds a threshold value. The method further includes in response to determining the cubic dimension exceeds the threshold value: generating a gridded point cloud, generating one or more patches in the gridded point cloud, converting the one or more patches in the gridded point cloud to one or more patches in the input point cloud, and outputting the one or more patches to one or more output devices.

Additional embodiments will be set forth in the description that follows and, in part, will be apparent from the description, and/or may be learned by practice of the presented embodiments of the disclosure.

BRIEF DESCRIPTION OF THE DRAWINGS

The above and other features and aspects of embodiments of the disclosure will be apparent from the following description taken in conjunction with the accompanying drawings, in which.

DETAILED DESCRIPTION

The following detailed description of example embodiments refers to the accompanying drawings. The same reference numbers in different drawings may identify the same or similar elements.

The foregoing disclosure provides illustration and description, but is not intended to be exhaustive or to limit the implementations to the precise form disclosed. Modifications and variations are possible in light of the above disclosure or may be acquired from practice of the implementations. Further, one or more features or components of one embodiment may be incorporated into or combined with another embodiment (or one or more features of another embodiment). Additionally, in the flowcharts and descriptions of operations provided below, it is understood that one or more operations may be omitted, one or more operations may be added, one or more operations may be performed simultaneously (at least in part), and the order of one or more operations may be switched.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code. It is understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of [A] and [B]" or "at least one of [A] or [B]" are to be understood as including only A, only B, or both A and B.

Figure 1:
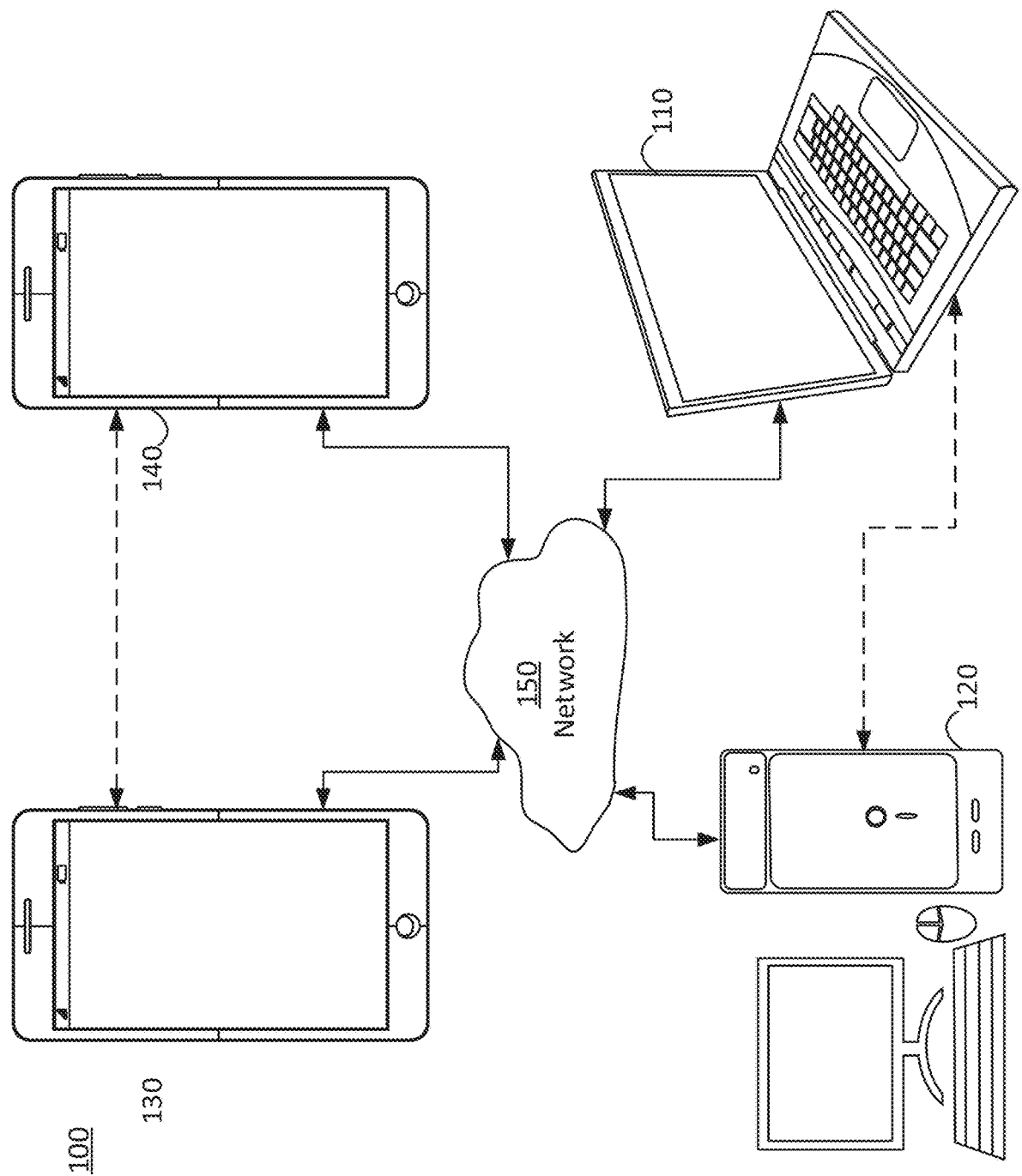
FIG. 1 is a schematic diagram of a communication system, in accordance with embodiments of the present disclosure.

FIG. 1 illustrates a simplified block diagram of a communication system 100 according to an embodiment of the present disclosure. The system 100 may include at least two terminals 110, 120 interconnected via a network 150. For unidirectional transmission of data, a first terminal 110 may code video data, which may include 3D point cloud data, at a local location for transmission to the other terminal 120 via the network 150. The second terminal 120 may receive the coded video data of the other terminal from the network 150, decode the coded data and display the recovered video data. Unidirectional data transmission may be common in media serving applications and the like.

FIG. 1 illustrates a second pair of terminals 130, 140 provided to support bidirectional transmission of coded video that may occur, for example, during videoconferencing. For bidirectional transmission of data, each terminal 130, 140 may code video data captured at a local location for transmission to the other terminal via the network 150. Each terminal 130, 140 also may receive the coded video data transmitted by the other terminal, may decode the coded data and may display the recovered video data at a local display device.

In FIG. 1, the terminals 110-140 may be, for example, servers, personal computers, and smart phones, and/or any other type of terminals. For example, the terminals (110-140) may be laptop computers, tablet computers, media players and/or dedicated video conferencing equipment. The network 150 represents any number of networks that convey coded video data among the terminals 110-140 including, for example, wireline and/or wireless communication networks. The communication network 150 may exchange data in circuit-switched and/or packet-switched channels. Representative networks include telecommunications networks, local area networks, wide area networks, and/or the Internet. For the purposes of the present discussion, the architecture and topology of the network 150 may be immaterial to the operation of the present disclosure unless explained herein below.

Figure 2:
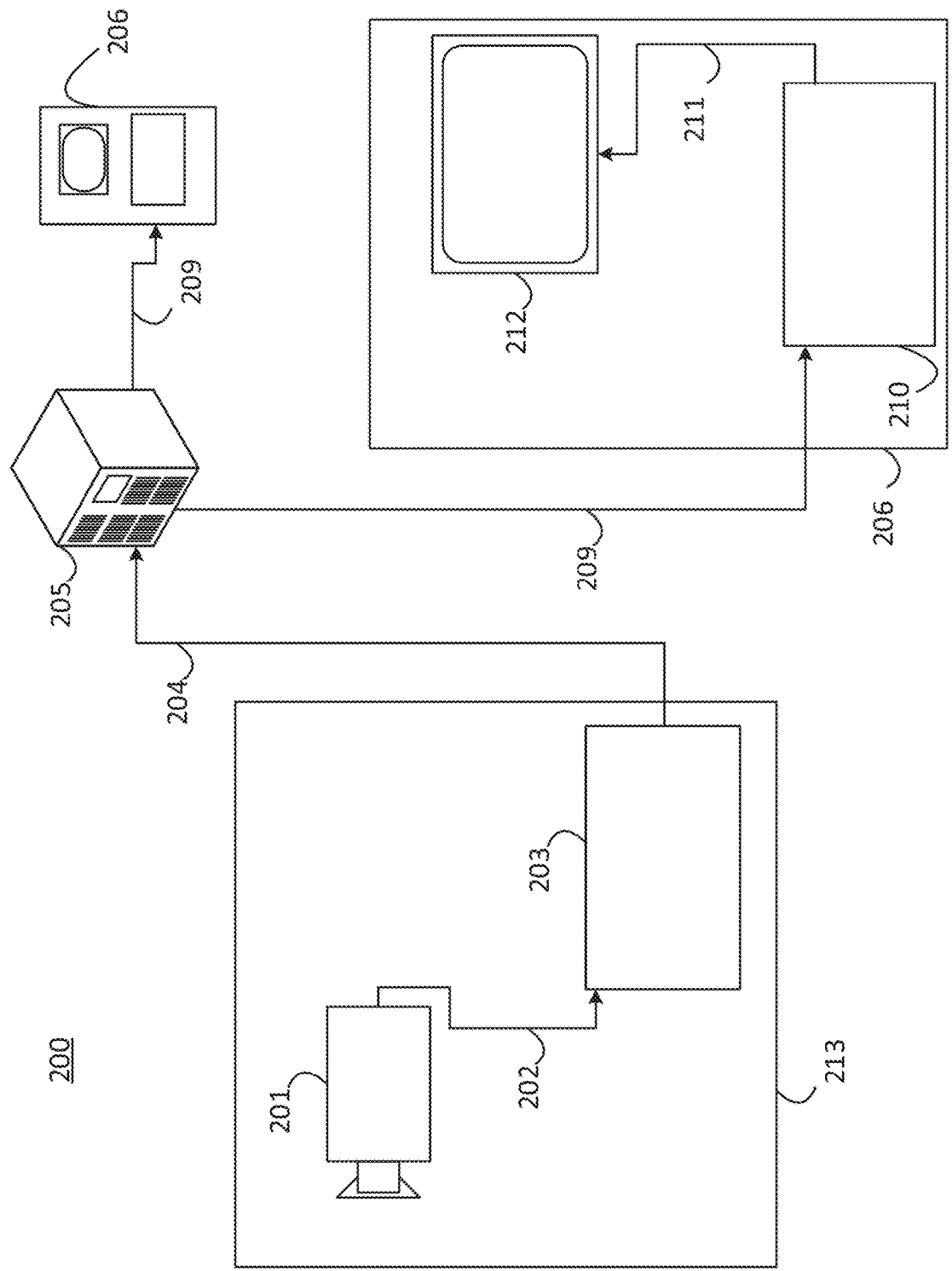
FIG. 2 is a schematic diagram of a streaming system, in accordance with embodiments of the present disclosure.

FIG. 2 illustrates, as an example of an application for the disclosed subject matter, a placement of a video encoder and decoder in a streaming environment. The disclosed subject matter may be used with other video enabled applications, including, for example, video conferencing, digital TV, storing of compressed video on digital media including CD, DVD, memory stick and the like, and so on.

As illustrated in FIG. 2, a streaming system 200 may include a capture subsystem 213 that includes a video source 201 and an encoder 203. The streaming system 200 may further include at least one streaming server 205 and/or at least one streaming client 206.

The video source 201 can create, for example, a stream 202 that includes a 3D point cloud corresponding to a 3D video. The video source 201 may include, for example, 3D sensors (e.g. depth sensors) or 3D imaging technology (e.g. digital camera(s)), and a computing device that is configured to generate the 3D point cloud using the data received from the 3D sensors or the 3D imaging technology. The sample stream 202, which may have a high data volume when compared to encoded video bitstreams, may be processed by the encoder 203 coupled to the video source 201. The encoder 203 can include hardware, software, or a combination thereof to enable or implement aspects of the disclosed subject matter as described in more detail below. The encoder 203 may also generate an encoded video bitstream 204. The encoded video bitstream 204, which may have e a lower data volume when compared to the uncompressed stream 202, may be stored on a streaming server 205 for future use. One or more streaming clients 206 can access the streaming server 205 to retrieve video bit streams 209 that may be copies of the encoded video bitstream 204.

The streaming clients 206 can include a video decoder 210 and a display 212. The video decoder 210 can, for example, decode video bitstream 209, which is an incoming copy of the encoded video bitstream 204, and create an outgoing video sample stream 211 that may be rendered on the display 212 or another rendering device (not depicted). In some streaming systems, the video bitstreams 204, 209 may be encoded according to certain video coding/compression standards. Examples of such standards include, but are not limited to, ITU-T Recommendation H.265, Versatile Video Coding (VVC), and MPEG/V-PCC.

Figure 3:
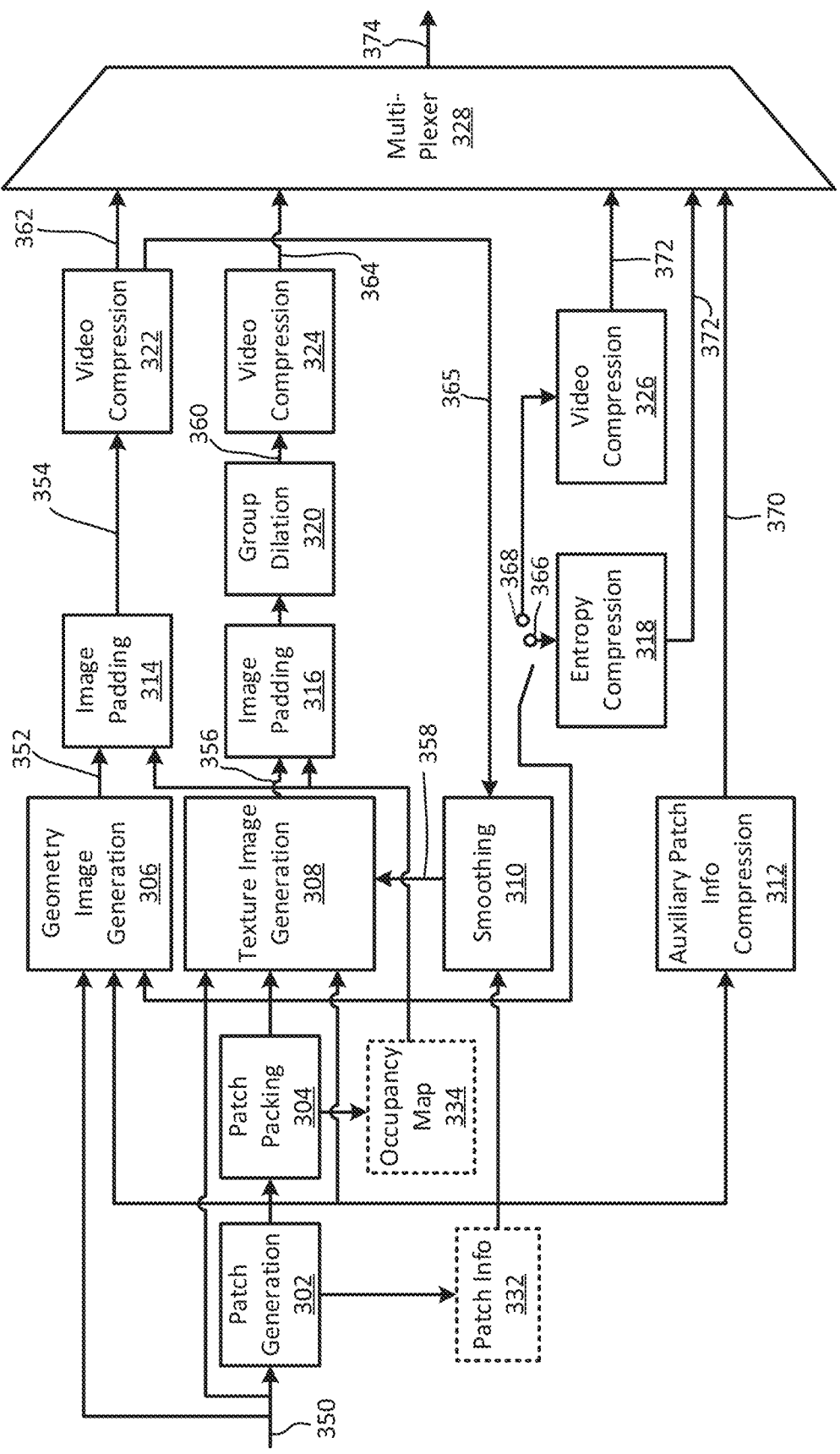
FIG. 3 is a schematic diagram of a video encoder, in accordance with embodiments of the present disclosure.
Figure 4:
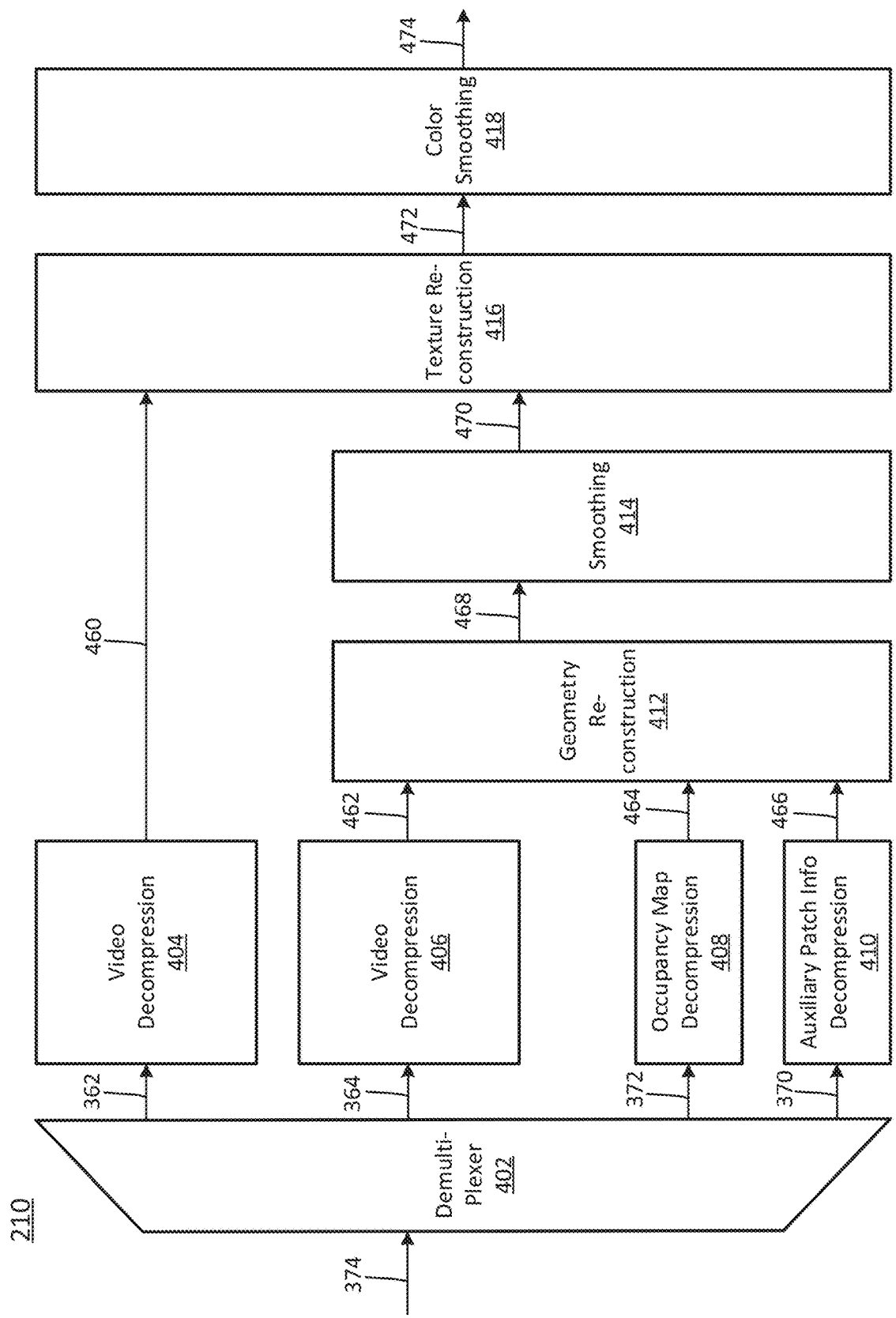
FIG. 4 is a schematic diagram of a video decoder in accordance with embodiments of the present disclosure.

With reference to FIGS. 3-4, some aspects of V-PCC that may be performed by embodiments of the present disclosure are described below.

FIG. 3 illustrates an example functional block diagram of a video encoder 203 according to an embodiment of the present disclosure. In embodiments, the video encoder 203 may be a video-based point cloud encoder.

As illustrated in FIG. 3, the video encoder 203 may receive a point cloud frame(s) 350, and generate a geometry image 352, a texture image 356, and an occupancy map 334 based on the point cloud frame 350. The video encoder 203 may compress the geometry image 352 into a compressed geometry image 362, the texture image 356 into a compressed texture image 364, and the occupancy map 334 into a compressed occupancy map 372. A multiplexer 328 of the video encoder 203 may form a compressed bitstream 374 that includes the compressed geometry image 362, the compressed texture image 364, and the compressed occupancy map 372.

More specifically, in embodiments, the video encoder 203 may include a patch generation module 302 that segments the point cloud frame 350 into patches. Patches are useful entities of V-PCC. The patch generation process includes decomposing the point cloud frame 350 into a minimum number of patches with smooth boundaries, while also minimizing the reconstruction error. Encoders of the present disclosure may implement various methods to generate such a decomposition.

The video encoder 203 may include a patch packing module 304 that performs a packing process. The packing process includes mapping the extracted patches onto a 2D grid while minimizing the unused space and guaranteeing that every M×M (e.g., 16×16) block of the grid is associated with a unique patch. Efficient patch packing directly impacts the compression efficiency either by minimizing the unused space or ensuring temporal consistency. The patch packing module 304 may generate the occupancy map 334.

The video encoder 203 may include a geometry image generation module 306 and a texture image generation module 308. In order to better handle the case of multiple points being projected to the same sample, each patch may be projected onto two images, referred to as layers. For example, the geometry image generation module 306 and the texture image generation module 308 may exploit the 3D to 2D mapping computed during the packing process of the patch packing module 304 to store the geometry and texture of the point cloud as images (a.k.a. layers). The generated images/layers may be stored as a video frame(s) and compressed using a video codec (e.g. HM video codec) according to configurations provided as parameters.

In embodiments, the geometry image generation module 306 generates the geometry image 352 and the texture image generation module 308 generates the texture image 356, based on the input point cloud frame 350 and the occupancy map 334. In an embodiment, the geometry image 352 may be represented by a monochromatic frame of W×H in YUV420-8 bit format. In an embodiment, the occupancy map 334 image consists of a binary map that indicates for each cell of the grid whether it belongs to the empty space or to the point cloud. To generate the texture image 356, the texture image generation module 308 may exploit the reconstructed/smoothed geometry 358 in order to compute the colors to be associated with the re-sampled points.

The video encoder 203 may also include an image padding module 314 and an image padding module 316 for padding the geometry image 352 and the texture image 356, respectively, to form a padded geometry image 354 and a padded texture image 360. The image padding (a.k.a. background filling) simply fills unused space of the images with redundant information. A good background filling is a one that minimally increases the bit rate while does not introduce significant coding distortion around the patch boundaries. The image padding module 314 and the image padding module 316 may use the occupancy map 334 to form the padded geometry image 354 and the padded texture image 360, respectively. In an embodiment, the video encoder 203 may include a group dilation module 320 to form the padded texture image 360.

The video encoder 203 may include a video compression module 322 and a video compression module 324 for compressing the padded geometry image 354 and the padded texture image 360 into the compressed geometry image 362 and the compressed texture image 364, respectively.

The video encoder 203 may include an entropy compression module 318 for lossless encoding 366 of the occupancy map 334 and a video compression module 326 for lossy encoding 368 of the occupancy map 334.

In embodiments, the video encoder 203 may include a smoothing module 310 for generating smoothed geometry 358 by using a reconstructed geometry image 365, provided by the video compression module 322, and patch info 332. The smoothing procedure of the smoothing module 310 may aim at alleviating potential discontinuities that may arise at the patch boundaries due to compression artifacts. The smoothed geometry 358 may be used by the texture image generation module 308 to generate the texture image 356.

The video encoder 203 may also include an auxiliary patch information compression module 312 for forming compressed auxiliary patch information 370 that is provided in the compressed bitstream 374 by the multiplexer 328.

FIG. 4 illustrates an example functional block diagram of a video decoder 210 according to an embodiment of the present disclosure. In embodiments, the video decoder 210 may be a video-based point cloud decoder.

As illustrated in FIG. 4, the video decoder 210 may receive the coded bitstream 374 from the video encoder 203 to obtain the compressed texture image 362, the compressed geometry image 364, the compressed occupancy map 372, and the compressed auxiliary patch information 370. The video decoder 210 may decode the compressed texture image 362, the compressed geometry image 364, the compressed occupancy map 372, and the compressed auxiliary patch information 370 to obtain a decompressed texture image 460, a decompressed geometry image 462, a decompressed occupancy map 464, and decompressed auxiliary patch information 466, respectively. Following, the video decoder 210 may generate a reconstructed point cloud 474 based on the decompressed texture image 460, the decompressed geometry image 462, the decompressed occupancy map 464, and the decompressed auxiliary patch information 466.

In embodiments, the video decoder 210 may include a demultiplexer 402 that separates the compressed texture image 362, the compressed geometry image 364, the compressed occupancy map 372, and the compressed auxiliary patch information 370 of the compressed bitstream 374 received.

The video decoder 210 may include a video decompression module 404, a video decompression module 406, an occupancy map decompression module 408, and an auxiliary patch information decompression module 410 that decode the compressed texture image 362, the compressed geometry image 364, the compressed occupancy map 372, and the compressed auxiliary patch information 370, respectively.

The video decoder 210 may include a geometry reconstruction module 412 that obtains reconstructed (three dimensional) geometry 468 based on the decompressed geometry image 462, the decompressed occupancy map 464, and the decompressed auxiliary patch information 466.

The video decoder 210 may include a smoothing module 414 that smooths the reconstructed geometry 468 to obtain smoothed geometry 470. The smoothing procedure may aim at alleviating potential discontinuities that may arise at the patch boundaries due to compression artifacts.

The video decoder 210 may include a texture reconstruction module 416 for obtaining reconstructed texture 472 based on the decompressed texture image 460 and the smoothed geometry 470.

The video decoder 210 may include a color smoothing module 418 that smooths the color of the reconstructed texture 472 to obtain a reconstructed point cloud 474. Non-neighboring patches in 3D space are often packed next to each other in 2D videos. This implies that pixel values from non-neighboring patches might be mixed up by the block-based video codec. The color smoothing of the color smoothing module 418 may aim to reduce the visible artifacts that appear at patch boundaries.

Patch Generation in Video-Based Point Cloud Compression (V-PCC)

In the MPEG PCC test model category 2 (TMC2) model, which may correspond to V-PCC, the patch generation may involve multiple steps. An example patch generation process 500 is illustrated in FIGS. 5 and 6A-6B.

Figure 5:
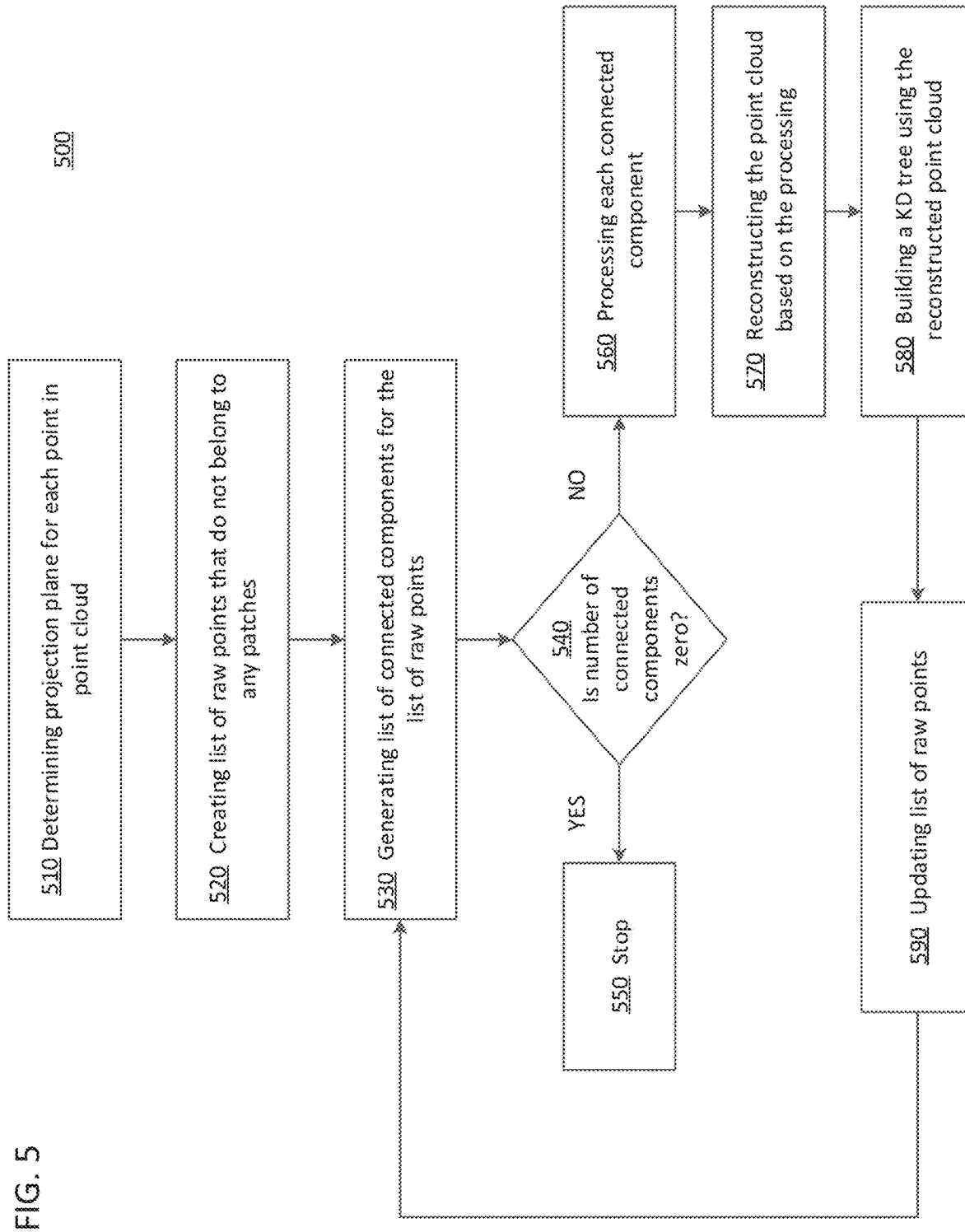
FIG. 5 is a flow diagram illustrating an example of a patch generation process, in accordance with embodiments of the present disclosure.
Figure 6A:
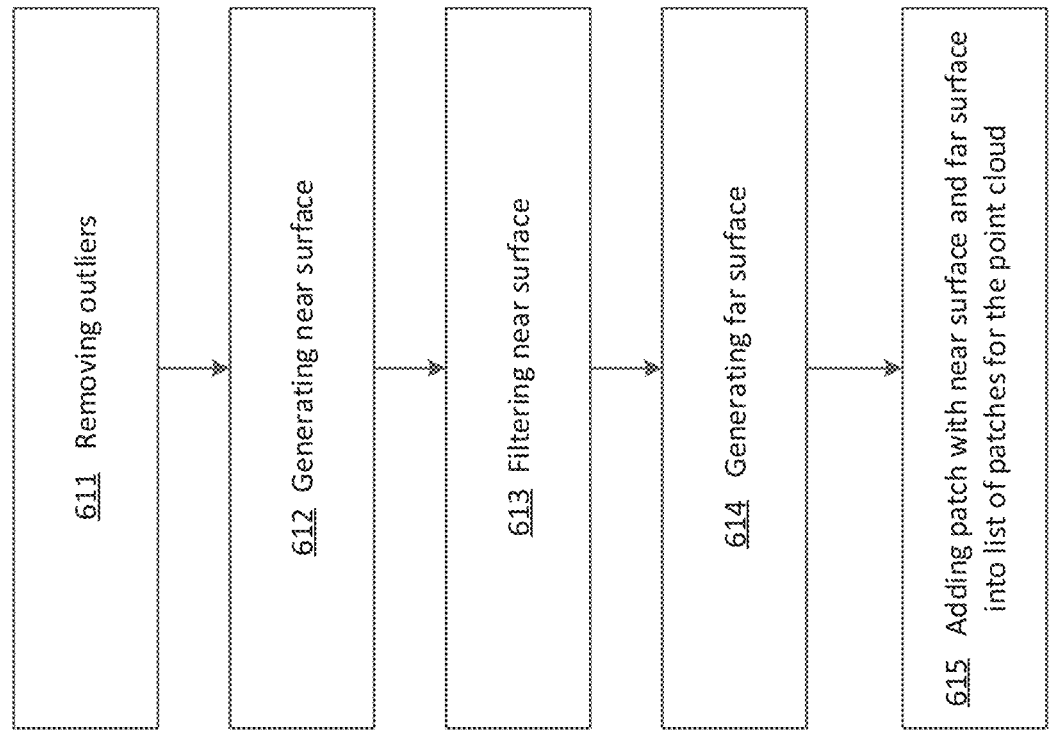
FIGS. 6A-6B are flow diagrams illustrating examples of connected component processing, in accordance with embodiments of the present disclosure.
Figure 6B:
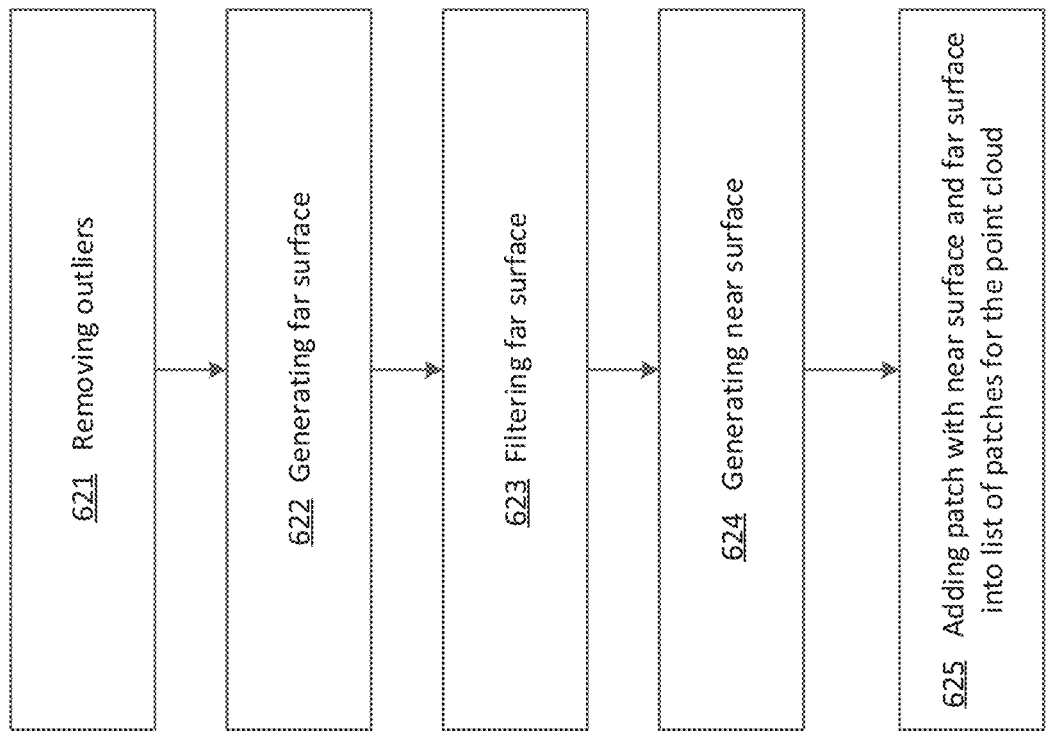

As illustrated in FIG. 5, operation 510 may include determining a projection plane for each point in a point cloud at operation 510 based on a defined clustering criterion, for example based on associated normal vectors and neighboring points.

Operation 520 may include creating a list of raw points that do not belong to any patches. Initially, no patch is generated and no point belongs to any patches.

Operation 530 may include, for the list of raw points, generating a list of connected components by grouping points that have the same projection plane and also are neighboring to each other. If the number of points in a connected component is less than a given threshold, the connected component may be removed from the list. For example, in some embodiments, each connected component may include a group of points that have a same projection plane and are neighboring to each other. Furthermore, for example, points may be neighboring to each other if the points are within a certain threshold distance, or if there are no other points between the points, or if the points satisfy some other neighboring condition.

Operation 540 may include determining whether the number of connected components in the list is zero. If the number of connected components in the list is zero, the patch generation process may stop at operation 550.

Operation 560 may include processing each connected component (CC) in the list. FIGS. 6A and 6B illustrate examples of the processing that may be performed in operation 560.

For example, as shown in FIG. 6A, operation 560', which may be an example of operation 560, may include operations 611-615. For convenience of description, operation 560' will be described here, and operation 560" will be described separately below.

As shown in FIG. 6A, operation 611 may include removing outliers. For example, the points in the CC may be projected to the associated projection plane. The projected coordinate of a 3D point in the 2D UV plane may be $(\hat{u}_i, \hat{v}_i)$, $i=0, \ldots, N-1$, where N is the number of points in the CC. Denote:

$$u_{min} = \min(u_0, u_1, \ldots, u_{N-1}) \quad Eq. \quad (1)$$

$$v_{min} = \min(v_0, v_1, \ldots, v_{N-1}), \quad Eq. \quad (2)$$

where $(u_i - U_{min}) > U_{threshold}$ Or $(v_i - v_{min}) > V_{threshold}$, where $U_{threshold}$ and $V_{thresold}$ may be user-defined thresholds. The i-th point may be called an outlier point and may be removed from the CC. The resulting connected component may be called an updated connected component, denoted as CC'.

Operation 612 may include generating a near surface. If CC' after operation 611 is not empty, the projected coordinate of a 3D point in the 2D UV plane may be denoted as $(\hat{u}_i, \hat{v}_i)$, $i=0, \ldots, \hat{N}-1$, where $\hat{N}$ is the number of points in CC'. The near surface, $S_{near}$ which is close to the projected plane, may be determined by selecting points satisfying the following condition: if one or more points have the same projected coordinate, select the point that has the smallest depth value to be part of the near surface $S_{near}$. Denote $(\tilde{u}_i, \tilde{v}_i)$, $i=0, \ldots, \tilde{N}-1$ as the projected UV coordinate, $\tilde{d}_i$, $i=0, \ldots, \tilde{N}-1$ as the depth value, $\tilde{p}_i$, $i=0, \ldots, \tilde{N}-1$ as the index of the 3D point in the point cloud, where N is the number of points in the near surface $S_{near}$.

Operation 613 may include filtering the near surface. For a T×T grid in the projected plane, where T may be user-defined positive integer, the minimum depth value of all those points in CC' that are projected to the T×T grid may be denoted as $\tilde{d}_{min}$. A user-defined threshold may be denoted as $\tilde{d}_{threshold}$, a user-defined surface thickness may be denoted as $\tilde{d}_{surface}$, the minimum depth value of all the points in CC' may be denoted as $\tilde{d}_{min}$, and the maximum allowed depth representation may be denoted as $D_{max}$. If a point $(\tilde{u}, \tilde{v}, \tilde{d})$ in $S_{near}$ that is projected to the T×T grid and satisfies the following condition:

$$-\tilde{d} > \tilde{d}_{min} + d_{threshold} \text{ Or}$$

$$(\tilde{d} + d_{surface}) > (\tilde{d}_{min} + D_{max}), \quad Eq. \quad (3)$$

where $(\tilde{u}, \tilde{v})$ is the projected coordinate and $\tilde{d}$ is the depth value of the point, the point may be removed from the near surface $S_{near}$.

Operation 614 may include generating a far surface. The far surface $S_{far}$ may be initialized as the same as the near surface. If multiple points in CC' are projected to the same UV coordinate $(\tilde{u}_i, \tilde{v}_i)$, the i-th point in $S_{far}$ may be replaced with the point having the largest depth value such that the distance between this point and the point $\tilde{p}_i$ in $S_{near}$ is not greater than $d_{surface}$ and their color values are close to each other.

Operation 615 may include adding the patch with the near surface and far surface into the list of patches for the point cloud.

Returning again to FIG. 5, after operation 560 is performed, operation 570 may include re-constructing the point cloud based on the points in $S_{near}$ and $S_{far}$ for all patches.

Operation 580 may include building a K-dimensional (KD) tree using the reconstructed point cloud.

Operation 590 may include, for each point in the original point cloud, searching the nearest neighbour in the reconstructed point using the KD tree. If the distance between a point and its nearest neighbour in reconstructed point cloud is greater than a user-defined threshold, the point may be classified as a raw point.

After operation 590 is performed, process 500 may return to operation 530.

In embodiments, process 500 may include more or fewer operations, and the operations may be combined or rearranged in any order.

Another example operation 560 is illustrated in FIG. 6B. For example, as shown in FIG. 6B, operation 560", which may be an example of operation 560, may include operations 621-625. For example, operation 621 may include removing outliers, operation 622 may include generating a far surface, operation 623 may include filtering the far surface, operation may include generating a near surface, and operation 625 may include adding the patch with the near surface and far surface into the list of patches for the point cloud.

In some embodiments, operation 622 may include determining the far surface ($S_{far}$), which is further away from the project plane by selecting points satisfying the following condition: if one or more points have the same projected coordinate, select the point that has the largest depth value to be part of the far surface $S_{far}$ In some embodiments, operation 622 may include, for a T×T grid in the projected plane, where T is user-defined positive integer, the maximum depth value of all those points that projected to the T×T grid may be denoted as $\tilde{d}_{max}$. Denote a user-defined threshold as $d_{threshold}$, a user-defined surface thickness as $d_{surface}$, the maximum depth value of all the points in CC' as $\hat{d}_{max}$, and the maximum allowed depth representation as $D_{max}$. If a point (ũ, ṽ, d̃) in $S_{far}$ that is projected to the T×T grid and satisfies the following condition:

$$\tilde{d} < \tilde{d}_{max} - d_{threshold} \text{ or}$$

$$(-\tilde{d}_{surface}) > (-\hat{d}_{max} + D_{max}), \quad \text{Eq. (4)}$$

where (ũ, ṽ) is the projected coordinate and d is the depth value of the point, the point is removed from the far surface $S_{far}$.

In some embodiments, operation 622 may include initializing the near surface $S_{near}$ as the same as the far surface. If multiple points in CC' are projected to the same UV coordinate (ũ$_i$, ṽ$_i$), replace the i-th point in $S_{near}$ with the point having the smallest depth value such that the distance between this point and the point $\tilde{p}_i$ in $S_{far}$ is not greater than $d_{surface}$ and their color values are close to each other.

As can be seen above, the patch generation process, such as process 500, may have a high computation complexity. Specifically operations 580 and 590 may be complicated due to KD tree construction and nearest point search in the KD tree especially for a large point cloud with millions of points. Therefore, it may be desirable to remove the usage of KD tree in the patch generation algorithm.

The proposed methods may be used separately or combined in any order. Further, each of the methods (or embodiments), encoder, and decoder may be implemented by processing circuitry (e.g., one or more processors or one or more integrated circuits). In one example, the one or more processors execute a program that is stored in a non-transitory computer-readable medium.

As shown in FIG. 5, a KD tree search may be used to determine the set of raw points that are not part of the list of generated patches or not close to the points in the generated patches. The set of raw points may be used for a new round of connected component generation and patch generation from the set of connected components.

Embodiments discussed below may relate to a patch generation method without the usage of a KD tree. For example, embodiments discussed below may correspond to modifications of process 500 or any of the steps illustrated in FIGS. 5 and 6A-6B and described above.

Grid-Based Patch Generation

Embodiments of the present disclosure are direct to a grid-based patch generation method. The main idea of this method is as follows: before patch generation, group voxels in a point cloud into grids as illustrated in FIG. 7, in accordance with process 700.

Figure 7:
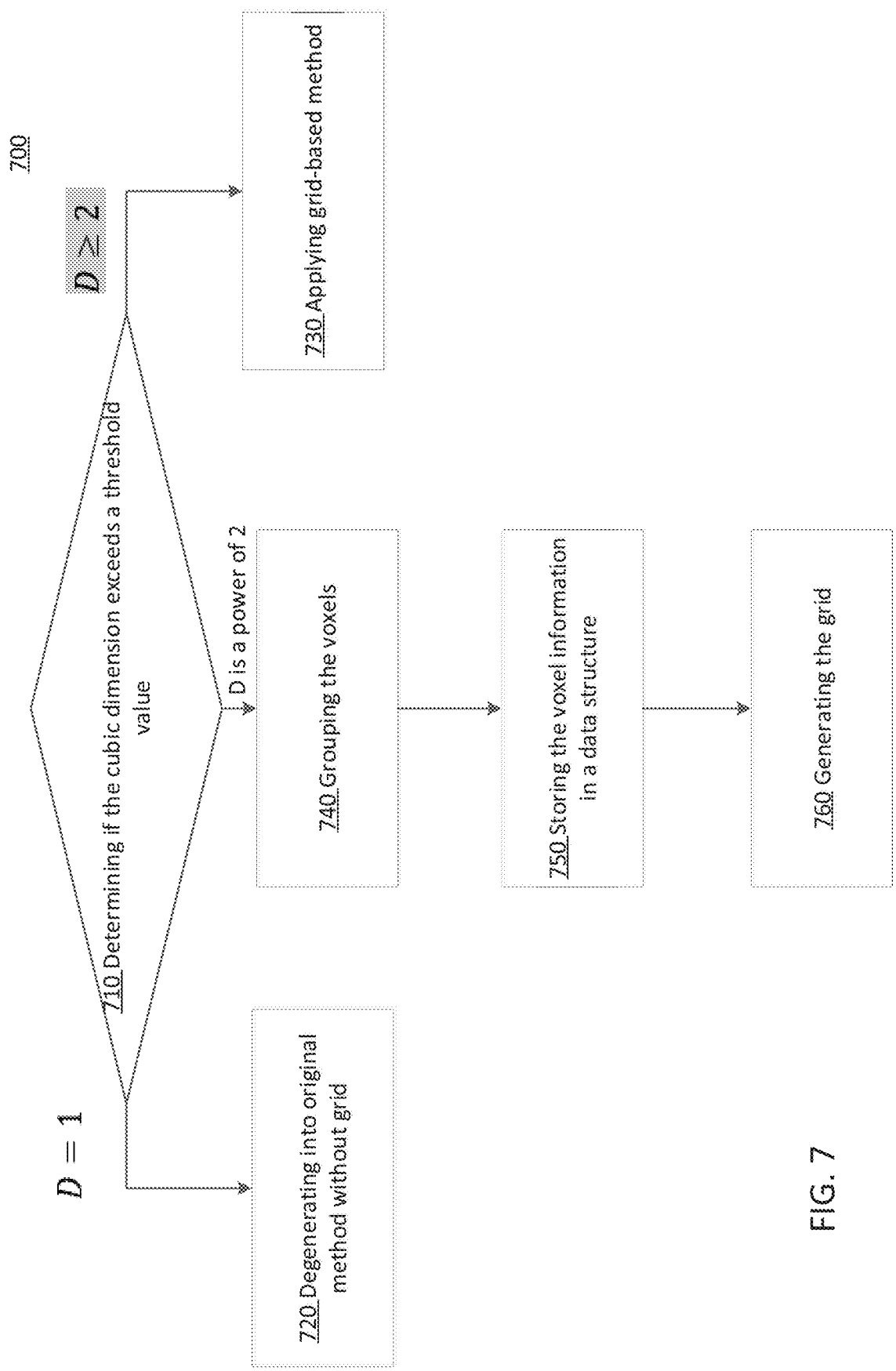
FIG. 7 is a flow diagram illustrating a process in a grid-based patch generation method, in accordance with embodiments of the present disclosure.

As illustrated in FIG. 7, operation 710 may include determining whether the cubic dimension associated with the one or more grids exceeds a threshold value. Each grid is a cubic with dimension of D×D×D where D is a positive integer.

If D=1, the process proceeds to operation 720, which may include degenerating into the original method without grid.

If D≥2, the process proceeds to operation 730, which may include grid-based method is applied.

When D is a power of 2, the step to determine whether a voxel belong to a voxel is as following:

Operation 740 may include denoting the geometry positions (3D coordinates) of voxels in a point cloud as $\{x_i, y_i, z_i\}$ for i=0, ..., N−1 where N is the number of voxels in the point cloud. Thus the voxel $\{x_i, y_i, z_i\}$ belongs to a grid with the following coordinate $\{\hat{x}_i, \hat{y}_i, \hat{z}_i\}$:

$$\hat{x}_i = (x_i + D >> 1)/D$$

$$\hat{y}_i = (y_i + D >> 1)/D$$

$$\hat{z}_i = (Z_i + D >> 1)/D \quad \text{Eq. (5)}$$

In another embodiment, the above relationship may be modified as:

$$\hat{x}_i = x_i/D$$

$$\hat{y}_i = y_i/D$$

$$\hat{z}_i = z_i/D \quad \text{Eq. (6)}$$

In Equation (5) and (6), the division is an integer division. If D is a power of 2, the integer division may be simplified as right shift operations.

Assume there are M distinct set of grid coordinates shown as $\{X_i, Y_i, Z_i\}$, i=0, ..., M−1. Thus, all those voxels with indices $i_0, i_1, ..., i_{G_i-1}$ satisfying the following condition:

$$\hat{x}_{i_g} = X_i$$

$$\hat{y}_{i_g} = Y_i$$

$$\hat{z}_{i_g} = Z_i \quad (7)$$

belong to the same i-th grid where Gi is the number of voxels in the i-th grid.

In one embodiment, if the input point cloud has attributes such as color or reflectance, the attribute value for the i-th grid may be the average values of all voxels belonging to the i-th grid.

Operation 750 may include a data structure that may be used to hold the information regarding all the voxels in each grid. In one embodiment, the indices of all the voxels in i-th grid, i.e., $\{i_0, i_1, \ldots, i_{G_i-1}\}$ may be stored in a mapping table for i=0, . . . , M−1. This feature may be called grid-to-voxel mapping table.

Operation 760 may include generating the grid. After the grid generation, the set of grids $\{X_i, Y_i, Z_i\}$, i=0, . . . , M−1 may be treated as a new point cloud so called a gridded point cloud.

The operations from the Patch Generation in Video-based Point Cloud compression section may be utilized to generate patches for the gridded point cloud. When D is greater than or equal to 2, M is much smaller than N. Thus, the complexity is much reduced. As a result, the patches in the gridded point cloud need to be converted back to the patches in the original point cloud.

Figure 8A:
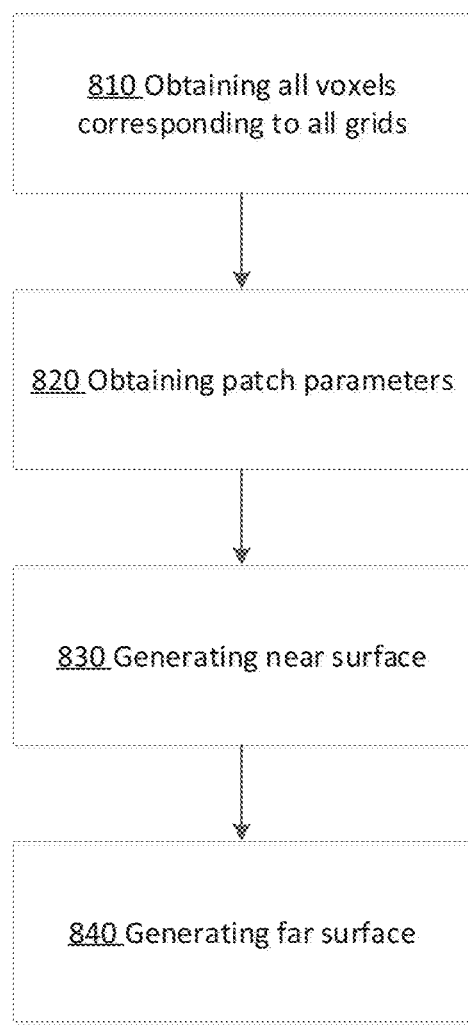
FIGS. 8A-8B are flow diagrams illustrating a process of converting a patch in a gridded point cloud, in accordance with embodiments of the present disclosure.

As illustrated in FIG. 8A, process 800 converts patches in a gridded point cloud to patches in the original point cloud.

Operation 810 may include obtaining all voxels corresponding to all the grids in the gridded point cloud using the grid-to-voxel mapping table and treat the set of obtained voxels as a connected component.

Operation 820 may include obtaining the patch parameters such as ($u_{min}$, $v_{min}$) for the connected component by first generating its bound box. ($u_{min}$, $v_{min}$) is defined above.

Operation 830 may include generating a near surface for this connected component as described above.

Operation 840 may include generating a far surface for this connected component as described above.

Figure 8B:
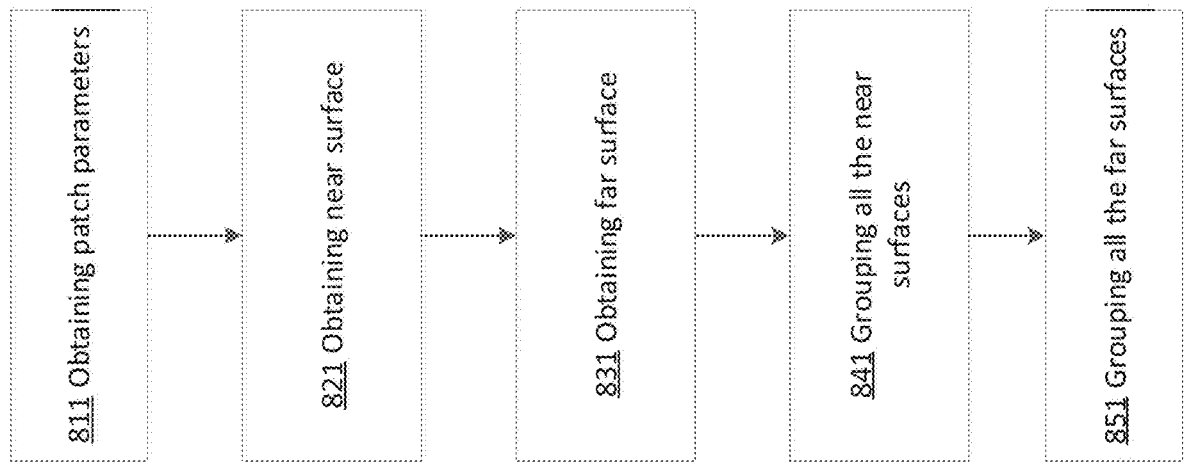

In another exemplary embodiment, to convert a patch in a gridded point cloud to a patch in the original point cloud, the following process 801 as illustrated in FIG. 8B may be employed:

Operation 811 may include obtaining the patch parameters, such as ($u_{min}$, $u_{min}$) for the patch in the original point cloud, using the patch parameters in the gridded patch by multiplication of a factor D.

Operation 821 may include treating all the points in each grid as a connected component, to obtain a near surface for this connected component as described above.

Operation 831 may include treating all the points in each grid as a connected component, to obtain a far surface for this connected component as described above.

Operation 841 may include grouping all the near surfaces for all grids to form the near surface for the patch in the original point cloud.

Operation 851 may include grouping all the far surfaces for all grids to form the near surface for the patch in the original point cloud.

The techniques, described above, may be implemented as computer software using computer-readable instructions and physically stored in one or more computer-readable media. For example, FIG. 9 shows a computer system 900 suitable for implementing certain embodiments of the disclosure.

The computer software may be coded using any suitable machine code or computer language, that may be subject to assembly, compilation, linking, or like mechanisms to create code including instructions that may be executed directly, or through interpretation, micro-code execution, and the like, by computer central processing units (CPUs), Graphics Processing Units (GPUs), and the like.

The instructions may be executed on various types of computers or components thereof, including, for example, personal computers, tablet computers, servers, smartphones, gaming devices, internet of things devices, and the like.

Figure 9:
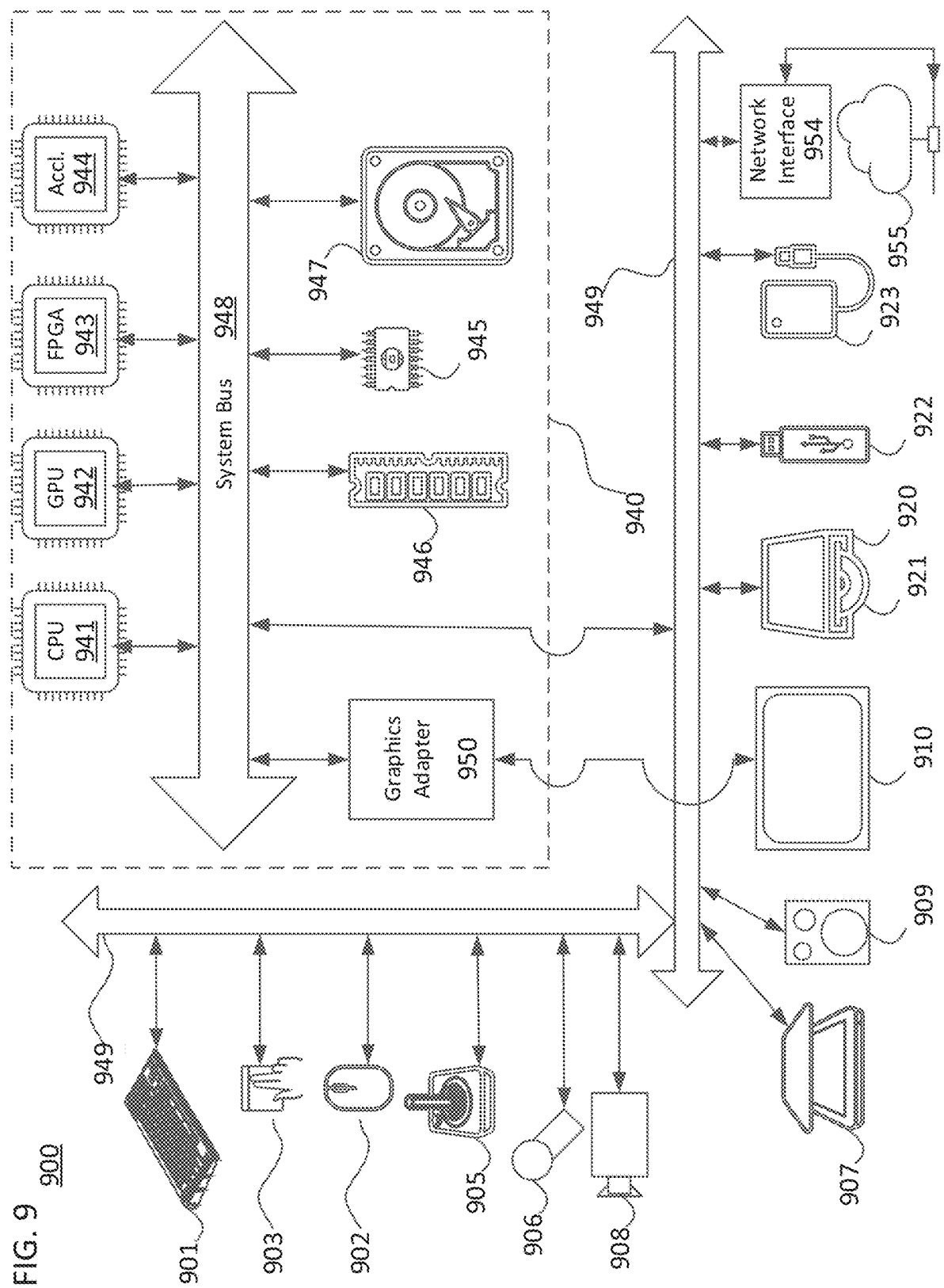
FIG. 9 is a diagram of a computer system, in accordance with embodiments of the present disclosure.

The components shown in FIG. 9 for computer system 900 are examples and are not intended to suggest any limitation as to the scope of use or functionality of the computer software implementing embodiments of the present disclosure. Neither should the configuration of components be interpreted as having any dependency or requirement relating to any one or combination of components illustrated in the non-limiting embodiment of a computer system 900.

Computer system 900 may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard 901, mouse 902, trackpad 903, touch screen 910, data-glove, joystick 905, microphone 906, scanner 907, camera 908.

Computer system 900 may also include certain human interface output devices. Such human interface output devices may be stimulating the senses of one or more human users through, for example, tactile output, sound, light, and smell/taste. Such human interface output devices may include tactile output devices (for example tactile feedback by the touch-screen 910, data glove, or joystick 905, but there can also be tactile feedback devices that do not serve as input devices). For example, such devices may be audio output devices (such as: speakers 909, headphones (not depicted)), visual output devices (such as screens 910 to include CRT screens, LCD screens, plasma screens, OLED screens, each with or without touch-screen input capability, each with or without tactile feedback capability-some of which may be capable to output two dimensional visual output or more than three dimensional output through means such as stereographic output; virtual-reality glasses (not depicted), holographic displays and smoke tanks (not depicted)), and printers (not depicted)).

Computer system 900 can also include human accessible storage devices and their associated media such as optical media including CD/DVD ROM/RW 920 with CD/DVD or the like media 921, thumb-drive 922, removable hard drive or solid state drive 923, legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system 900 can also include interface to one or more communication networks. Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth.

Certain networks commonly require external network interface adapters that attached to certain general purpose data ports or peripheral buses 949 (such as, for example USB ports of the computer system 900; others are commonly integrated into the core of the computer system 900 by attachment to a system bus as described below (for example Ethernet interface into a PC computer system or cellular network interface into a smartphone computer system). Using any of these networks, computer system 900 can communicate with other entities. Such communication may be uni-directional, receive only (for example, broadcast TV), uni-directional send-only (for example CANbus to certain CANbus devices), or bi-directional, for example to other computer systems using local or wide area digital networks. Such communication can include communication to a cloud computing environment 955. Certain protocols and protocol stacks may be used on each of those networks and network interfaces as described above.

Aforementioned human interface devices, human-accessible storage devices, and network interfaces 954 may be attached to a core 940 of the computer system 900.

The core 940 can include one or more Central Processing Units (CPU) 941, Graphics Processing Units (GPU) 942, specialized programmable processing units in the form of Field Programmable Gate Areas (FPGA) 943, hardware accelerators for certain tasks 944, and so forth. These devices, along with Read-only memory (ROM) 945, Random-access memory 946, internal mass storage such as internal non-user accessible hard drives, SSDs, and the like 947, may be connected through a system bus 948. In some computer systems, the system bus 948 may be accessible in the form of one or more physical plugs to enable extensions by additional CPUs, GPU, and the like. The peripheral devices may be attached either directly to the core's system bus 948, or through a peripheral bus 949. Architectures for a peripheral bus include PCI, USB, and the like. A graphics adapter 950 may be included in the core 940.

CPUs 941, GPUs 942, FPGAs 943, and accelerators 944 can execute certain instructions that, in combination, can make up the aforementioned computer code. That computer code may be stored in ROM 945 or RAM 946. Transitional data may be also be stored in RAM 946, whereas permanent data may be stored for example, in the internal mass storage 947. Fast storage and retrieve to any of the memory devices may be enabled through the use of cache memory, that may be closely associated with one or more CPU 941, GPU 942, mass storage 947, ROM 945, RAM 946, and the like.

The computer readable media can have computer code thereon for performing various computer-implemented operations. The media and computer code may be those specially designed and constructed for the purposes of the present disclosure, or the media and computer code may be of the kind well known and available to those having skill in the computer software arts.

As an example and not by way of limitation, the computer system having architecture 900, and specifically the core 940 can provide functionality as a result of processor(s) (including CPUs, GPUs, FPGA, accelerators, and the like) executing software embodied in one or more tangible, computer-readable media. Such computer-readable media may be media associated with user-accessible mass storage as introduced above, as well as certain storage of the core 940 that are of non-transitory nature, such as core-internal mass storage 947 or ROM 945. The software implementing various embodiments of the present disclosure may be stored in such devices and executed by core 940. A computer-readable medium can include one or more memory devices or chips, according to particular needs. The software can cause the core 940 and specifically the processors therein (including CPU, GPU, FPGA, and the like) to execute particular processes or particular parts of particular processes described herein, including defining data structures stored in RAM 946 and modifying such data structures according to the processes defined by the software. In addition or as an alternative, the computer system can provide functionality as a result of logic hardwired or otherwise embodied in a circuit (for example: accelerator 944), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

The foregoing disclosure provides illustration and description, but is not intended to be exhaustive or to limit the implementations to the precise form disclosed. Modifications and variations are possible in light of the above disclosure or may be acquired from practice of the implementations.

Some embodiments may relate to a system, a method, and/or a computer readable medium at any possible technical detail level of integration. Further, one or more of the above components described above may be implemented as instructions stored on a computer readable medium and executable by at least one processor (and/or may include at least one processor). The computer readable medium may include a computer-readable non-transitory storage medium (or media) having computer readable program instructions thereon for causing a processor to carry out operations.

The flowchart and block diagrams in the figures illustrate the architecture, functionality, and operation of possible implementations of systems, methods, and computer readable media according to various embodiments. In this regard, each block in the flowchart or block diagrams may represent a module, segment, or portion of instructions, which comprises one or more executable instructions for implementing the specified logical operation(s). The method, computer system, and computer readable medium may include additional blocks, fewer blocks, different blocks, or differently arranged blocks than those depicted in the Figures. In some alternative implementations, the operations noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified operations or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

The above disclosure also encompasses the embodiments listed below:

(1) A method for grid-based patch generation for point cloud coding, the method performed by at least one processor and including: obtaining an input that is a point cloud; grouping one or more voxels in the point cloud into one or more grids, the one or more grids having a cubic dimension; determining whether the cubic dimension associated with the one or more grids exceeds a threshold value; in response to determining the cubic dimension exceeds the threshold value: generating a gridded point cloud, generating one or more patches in the gridded point cloud, converting the one or more patches in the gridded point cloud to one or more patches in the input point cloud, and outputting the one or more patches to one or more output devices.

(2) The method of feature (1), further including, in response to determining that the cubic dimension exceeds the threshold value, storing a mapping between the one or more voxels and the one or more grids.

(3) The method of feature (1) or (2), further including, in response to determining that the cubic dimension does not exceed the threshold value, coding the point cloud using a K dimensional (KD) tree instead without gridding.

(4) The method according to any one of features (1)-(3), in which each of the one or more grids has a cubic dimension of D×D×D, wherein D is a positive integer.

(5) The method according to any one of features (1)-(4), in which the threshold value is 2.

(6) The method according to any one of features (1)-(5), in which a mapping table is used to hold information regarding the one or more voxels in the one or more grids.

(7) The method according to any one of features (1)-(6), in which the converting the one or more patches in the gridded point cloud to patches in the input point cloud includes: obtaining each voxel corresponding to the one or more grids in the gridded point cloud using the grid-to-voxel mapping table, treating the set of obtained voxels as a connected component, obtaining one or more patch parameters for the connected component by generating a bound box, generating a near surface, and generating a far surface, in which the near surface is closer to a project plane than the far surface.

(8) The method according to any one of features (1)-(7), in which the converting the one or more patches in the gridded point cloud to patches in the input point cloud includes: obtaining one or more patch parameters and using the patch parameters in the gridded patch by multiplication of a factor D, treating one or more points in the one or more grids as one or more connected components, obtaining a near surface for the one or more connected components, obtaining a far surface for the one or more connected components, grouping the near surfaces for the one or more grids to form a near surface for the one or more patches in the input point cloud, and grouping the far surfaces for the one or more grids to form a far surface for the one or more patches in the original point cloud.

(9) The method according to any one of features (1)-(8), in which the input point cloud has one or more attributes comprising color and reflectance.

(10) An apparatus for grid-based patch generation for point cloud coding, the apparatus including: at least one memory configured to store computer program code; at least one processor configured to access the computer program code and operate as instructed by the computer program code, the computer program code including: obtaining code configured to cause the at least one processor to obtain an input that is a point cloud; grouping code configured to cause the at least one processor to group one or more voxels in the point cloud into one or more grids, the one or more grids having a cubic dimension; determining code configured to cause the at least one processor to determine whether the cubic dimension associated with the one or more grids exceeds a threshold value; in response to determining the cubic dimension exceeds the threshold value the code is further configured to cause the at least one processor to: generate a gridded point cloud, generate one or more patches in the gridded point cloud, convert the one or more patches in the gridded point cloud to one or more patches in the input point cloud, and output the one or more patches to one or more output devices.

(11) The apparatus of feature (10), in which in response to determining that the cubic dimension exceeds the threshold value the computer program code is further configured to cause the at least one processor to store a mapping between the one or more voxels and the one or more grids.

(12) The apparatus of feature (10) or (11), in which in response to determining that the cubic dimension does not exceed the threshold value the computer program code is further configured to cause the at least one processor to code the point cloud using a K dimensional (KD) tree instead without gridding.

(13) The apparatus according to any one of features (10)-(12), in which each of the one or more grids has a cubic dimension of D×D×D, wherein D is a positive integer.

(14) The apparatus according to feature (10) or (13), in which the threshold value is 2.

(15) The apparatus according to any one of features (10)-(14), in which a mapping table is used to hold information regarding the one or more voxels in the one or more grids.

(16) The apparatus according to any one of features (10)-(15), in which the converting code configured to cause the at least one processor to convert the one or more patches in the gridded point cloud to patches in the input point cloud further causes the at least one processor to: obtain each voxel corresponding to the one or more grids in the gridded point cloud using the grid-to-voxel mapping table, treat the set of obtained voxels as a connected component, obtain one or more patch parameters for the connected component by generating a bound box, generate a near surface, and generate a far surface, in which the near surface is closer to a project plane than the far surface.

(17) The apparatus according any one of features (10)-(16), in which the converting code configured to cause the at least one processor to convert the one or more patches in the gridded point cloud to patches in the input point cloud further causes the at least one processor to: obtain one or more patch parameters and using the patch parameters in the gridded patch by multiplication of a factor D, treat one or more points in the one or more grids as one or more connected components, obtain a near surface for the one or more connected components, obtain a far surface for the one or more connected components, group the near surfaces for the one or more grids to form a near surface for the one or more patches in the input point cloud, and group the far surfaces for the one or more grids to form a far surface for the one or more patches in the original point cloud.

(18) A non-transitory computer readable medium having stored thereon computer instructions that when executed by at least one processor cause the at least one processor to: obtain an input that is a point cloud; group one or more voxels in the point cloud into one or more grids, the one or more grids having a cubic dimension; determine whether the cubic dimension associated with the one or more grids exceeds a threshold value; in response to determining the cubic dimension exceeds the threshold value: generate a gridded point cloud, generate one or more patches in the gridded point cloud, convert the one or more patches in the gridded point cloud to one or more patches in the input point cloud, and output the one or more patches to one or more output devices.

(19) The non-transitory computer readable medium according to feature (18), in which in response to determining that the cubic dimension exceeds the threshold value, the instructions cause the at least one processor to store a mapping between the one or more voxels and the one or more grids.

(20) The non-transitory computer readable medium according to feature (18), in which in response to determining that the cubic dimension does not exceed the threshold value, the instructions cause the at least one processor to code the point cloud using a K dimensional (KD) tree instead without gridding.

What is described above is merely example embodiments of the disclosure, and certainly is not intended to limit the scope of the claims of the disclosure. Therefore, equivalent variations made in accordance with the claims of the disclosure shall fall within the scope of the disclosure.

What is claimed is:

1. A method for grid-based patch generation for point cloud coding, the method being performed by at least one processor and comprising:
    obtaining an input that is a point cloud;
    grouping one or more voxels in the point cloud into one or more grids, the one or more grids having a cubic dimension;
    determining whether the cubic dimension associated with the one or more grids exceeds a threshold value;
    when determining that the cubic dimension exceeds the threshold value:
    generating a gridded point cloud,
    generating one or more patches in the gridded point cloud,
    converting the one or more patches in the gridded point cloud to one or more patches in an input point cloud, and
    outputting the one or more patches to one or more output devices; and
    when determining that the cubic dimension does not exceed the threshold value, encoding the point cloud using a K dimensional (KD) tree without gridding.

2. The method of claim 1, further comprising: in response to determining that the cubic dimension exceeds the threshold value, storing a mapping between the one or more voxels and the one or more grids.

3. The method of claim 1, wherein each of the one or more grids has a cubic dimension of D×D×D, wherein D is a positive integer.

4. The method of claim 1, wherein the threshold value is 2.

5. The method of claim 2, wherein the storing the mapping comprises storing the mapping between the one or more voxels and the one or more grids by using a mapping table.

6. The method of claim 5, wherein the converting the one or more patches in the gridded point cloud to patches in the input point cloud comprises:
    obtaining each voxel corresponding to the one or more grids in the gridded point cloud using the mapping table,
    treating a set of obtained voxels as a connected component,
    obtaining one or more patch parameters for the connected component by generating a bound box,
    generating a near surface, and
    generating a far surface,
    wherein the near surface is closer to a project plane than the far surface.

7. The method of claim 1, wherein the converting the one or more patches in the gridded point cloud to patches in the input point cloud comprises:
    obtaining one or more patch parameters and using the one or more patch parameters in a gridded patch by multiplication of a factor D,
    treating one or more points in the one or more grids as one or more connected components,
    obtaining a near surface for the one or more connected components,
    obtaining a far surface for the one or more connected components,
    grouping near surfaces for the one or more grids to form a near surface for the one or more patches in the input point cloud, and
    grouping far surfaces for the one or more grids to form a far surface for the one or more patches in the input point cloud.

8. The method of claim 1, wherein the input point cloud has one or more attributes comprising color and reflectance.

9. An apparatus for grid-based patch generation for point cloud coding, the apparatus comprising:
    at least one memory configured to store computer program code;
    at least one processor configured to access the at least one memory and operate as instructed by the computer program code, the computer program code including:
    obtaining code configured to cause the at least one processor to obtain an input that is a point cloud;
    grouping code configured to cause the at least one processor to group one or more voxels in the point cloud into one or more grids, the one or more grids having a cubic dimension;
    determining code configured to cause the at least one processor to determine whether the cubic dimension associated with the one or more grids exceeds a threshold value;
    when determining that the cubic dimension exceeds the threshold value, the computer program code is further configured to cause the at least one processor to:
    generate a gridded point cloud,
    generate one or more patches in the gridded point cloud,
    convert the one or more patches in the gridded point cloud to one or more patches in an input point cloud, and
    output the one or more patches to one or more output devices; and
    when determining that the cubic dimension does not exceed the threshold value, encode the point cloud using a K dimensional (KD) tree without gridding.

10. The apparatus of claim 9, wherein in response to determining that the cubic dimension exceeds the threshold value the computer program code is further configured to cause the at least one processor to store a mapping between the one or more voxels and the one or more grids.

11. The apparatus according to claim 9 wherein each of the one or more grids has a cubic dimension of D×D×D, wherein D is a positive integer.

12. The apparatus according to claim 9, wherein the threshold value is 2.

13. The apparatus according to claim 10, wherein a mapping table is used to store information regarding the one or more voxels and the one or more grids.

14. The apparatus according to claim 13, wherein the computer program code configured to cause the at least one processor to convert the one or more patches in the gridded point cloud to patches in the input point cloud is further configured to cause the at least one processor to:
obtain each voxel corresponding to the one or more grids in the gridded point cloud using the mapping table,
treat a set of obtained voxels as a connected component,
obtain one or more patch parameters for the connected component by generating a bound box,
generate a near surface, and
generate a far surface,
wherein the near surface is closer to a project plane than the far surface.

15. The apparatus according to claim 9, wherein the computer program code configured to cause the at least one processor to convert the one or more patches in the gridded point cloud to patches in the input point cloud is further configured to cause the at least one processor to:
obtain one or more patch parameters and using the one or more patch parameters in a gridded patch by multiplication of a factor D,
treat one or more points in the one or more grids as one or more connected components,
obtain a near surface for the one or more connected components,
obtain a far surface for the one or more connected components,
group near surfaces for the one or more grids to form a near surface for the one or more patches in the input point cloud, and
group far surfaces for the one or more grids to form a far surface for the one or more patches in the input point cloud.

16. A non-transitory computer readable medium having stored thereon computer instructions that when executed by at least one processor cause the at least one processor to:
obtain an input that is a point cloud;
group one or more voxels in the point cloud into one or more grids, the one or more grids having a cubic dimension;
determine whether the cubic dimension associated with the one or more grids exceeds a threshold value;
when determining that the cubic dimension exceeds the threshold value:
generate a gridded point cloud,
generate one or more patches in the gridded point cloud,
convert the one or more patches in the gridded point cloud to one or more patches in an input point cloud, and
output the one or more patches to one or more output devices; and
when determining that the cubic dimension does not exceed the threshold value, encode the point cloud using a K dimensional (KD) tree without gridding.

17. The non-transitory computer readable medium according to claim 16, wherein in response to determining that the cubic dimension exceeds the threshold value, the computer instructions further cause the at least one processor to store a mapping between the one or more voxels and the one or more grids.

* * * * *